(12) United States Patent
Falchuk

(10) Patent No.: US 8,296,675 B2
(45) Date of Patent: Oct. 23, 2012

(54) SYSTEM AND METHOD FOR CAPTURING, AGGREGATING AND PRESENTING ATTENTION HOTSPOTS IN SHARED MEDIA

(75) Inventor: Benjamin Falchuk, Upper Nyack, NY (US)

(73) Assignee: Telcordia Technologies, Inc., Piscataway, NJ (US)

( * ) Notice: Subject to any disclaimer, the term of this patent is extended or adjusted under 35 U.S.C. 154(b) by 261 days.

(21) Appl. No.: 12/612,719

(22) Filed: Nov. 5, 2009

(65) Prior Publication Data

US 2010/0229121 A1    Sep. 9, 2010

Related U.S. Application Data

(60) Provisional application No. 61/158,541, filed on Mar. 9, 2009.

(51) Int. Cl.
 G06F 3/048 (2006.01)
 G06F 3/00 (2006.01)
(52) U.S. Cl. ......................................... 715/787; 715/721
(58) Field of Classification Search .................. 715/205, 715/241, 745, 760, 817, 787, 721
 See application file for complete search history.

(56) References Cited

U.S. PATENT DOCUMENTS

| | | | |
|---|---|---|---|
| 5,495,562 A | 2/1996 | Denney et al. | |
| 5,664,227 A | 9/1997 | Mauldin et al. | |
| 5,852,435 A | 12/1998 | Vigneaux et al. | |
| 5,890,152 A | 3/1999 | Rapaport et al. | |
| 6,069,606 A | 5/2000 | Sciammarella et al. | |
| 6,281,898 B1 | 8/2001 | Nikolovska et al. | |
| 6,332,147 B1 * | 12/2001 | Moran et al. | 715/203 |
| 6,526,219 B1 * | 2/2003 | Posa et al. | 386/240 |
| 6,574,416 B1 | 6/2003 | Posa et al. | |
| RE38,401 E | 1/2004 | Goldberg et al. | |
| 6,778,192 B2 * | 8/2004 | Arbab et al. | 715/786 |
| RE38,609 E | 10/2004 | Chen et al. | |
| 6,807,361 B1 | 10/2004 | Girgensohn et al. | |
| 6,977,659 B2 | 12/2005 | Dumitras et al. | |
| 7,149,974 B2 | 12/2006 | Girgensohn et al. | |

(Continued)

OTHER PUBLICATIONS

JA Hartigan et al., "K-means clustering algorithm", JR Stat. Soc. Ser. C-Appl. Stat., 1979.

(Continued)

*Primary Examiner* — Doon Chow
*Assistant Examiner* — Wilson Varga
(74) *Attorney, Agent, or Firm* — Philip J. Feig

(57) ABSTRACT

A method and system for providing an attention hotspot in temporal media is provided and executes following explicit or implicit user actions. The method comprises identifying at least one event related to playback or browsing of the temporal media, deriving the significance of the identified event in accordance with one or more rules, assigning a signifier based on the derived significance of the event, and associating the signifier with a specific segment of the temporal media and user. The system comprises a server and a mobile device, wherein the server is operable to identify at least one event related to playback of the temporal media, derive the significance of the identified event in accordance with one or more rules, select a signifier based on the derived significance of the event, and associate the signifier with a specific segment of the temporal media. The server aggregates and averages the cumulative attention hotspots of a greater community for the purposes of improving user experience. The server provides the signifier(s) to the mobile device. A computer program product embodying the method is also disclosed.

9 Claims, 6 Drawing Sheets

U.S. PATENT DOCUMENTS

| | | | |
|---|---|---|---|
| 7,194,527 B2 | 3/2007 | Drucker et al. | |
| 7,246,322 B2 | 7/2007 | Neely et al. | |
| 7,257,774 B2* | 8/2007 | Denoue et al. | 715/719 |
| 7,274,741 B2 | 9/2007 | Ma et al. | |
| 7,437,005 B2 | 10/2008 | Drucker et al. | |
| 7,483,618 B1* | 1/2009 | Edwards et al. | 386/278 |
| 7,559,039 B2 | 7/2009 | Ridgley et al. | |
| 7,664,775 B2 | 2/2010 | Reed et al. | |
| 7,689,525 B2 | 3/2010 | Drucker et al. | |
| 7,769,832 B2 | 8/2010 | Drucker et al. | |
| 7,806,767 B2 | 10/2010 | Kitao | |
| 7,877,707 B2 | 1/2011 | Westerman et al. | |
| 7,956,848 B2 | 6/2011 | Chaudhri | |
| 2002/0012526 A1* | 1/2002 | Sai et al. | 386/69 |
| 2005/0097135 A1* | 5/2005 | Epperson et al. | 707/104.1 |
| 2005/0120053 A1 | 6/2005 | Watson | |
| 2005/0192924 A1 | 9/2005 | Drucker et al. | |
| 2006/0197753 A1 | 9/2006 | Hotelling | |
| 2007/0011603 A1 | 1/2007 | Makela | |
| 2007/0027839 A1 | 2/2007 | Ives | |
| 2007/0061247 A1 | 3/2007 | Ramer et al. | |
| 2007/0083818 A1 | 4/2007 | Drucker et al. | |
| 2007/0121015 A1 | 5/2007 | Gu et al. | |
| 2007/0220575 A1 | 9/2007 | Cooper et al. | |
| 2007/0250901 A1* | 10/2007 | McIntire et al. | 725/146 |
| 2008/0088602 A1 | 4/2008 | Hotelling | |
| 2008/0092168 A1* | 4/2008 | Logan et al. | 725/44 |
| 2008/0122796 A1 | 5/2008 | Jobs et al. | |
| 2008/0298643 A1 | 12/2008 | Lawther | |
| 2008/0312949 A1* | 12/2008 | Nagasaka et al. | 705/1 |
| 2008/0313570 A1* | 12/2008 | Shamma et al. | 715/846 |
| 2009/0058822 A1 | 3/2009 | Chaudhri | |
| 2009/0094556 A1* | 4/2009 | Howard et al. | 715/848 |
| 2009/0116817 A1* | 5/2009 | Kim et al. | 386/95 |
| 2009/0226044 A1 | 9/2009 | Ngan et al. | |
| 2009/0289937 A1 | 11/2009 | Flake et al. | |
| 2010/0005393 A1* | 1/2010 | Tokashiki et al. | 715/716 |
| 2010/0145794 A1 | 6/2010 | Barger et al. | |

OTHER PUBLICATIONS

International Search report, dated Apr. 28, 2010, (2 Pages).

B. Falchuk, A.Glasman, K.Glasman, "Tool for Video Content Understanding on Smartphones", Proc. 10th ACM Int'l. Conf. on Human-Computer Interaction with Mobile Devices and Services (MobileHCI 2008) Amsterdam, 2008.

U.S. Appl. No. 61/057,004.

U.S. Appl. No. 61/057,010.

S.W. Smoliar, et al., "Content Based Video Indexing and Retrieval," IEEE Multimedia, vol. 1, Issue 2 pp. 62-72, Summer 1994.

B. Falchuk, et al., "A Tool for Video Content Understanding on Mobile Smartphones," Proc. 10th ACM Int'l Conf. on Human-Computer Interaction with Mobile Devices and Services (MobileHCI 2008) Amsterdam, 2008.

* cited by examiner

SYSTEM AND METHOD FOR CAPTURING, AGGREGATING AND PRESENTING ATTENTION HOTSPOTS IN SHARED MEDIA

CROSS REFERENCE TO RELATED APPLICATIONS

This application claims the benefit of U.S. Provisional Application No. 61/158,541 filed on Mar. 9, 2009, the disclosure of which is incorporated herein by reference in its entirety.

FIELD OF THE INVENTION

The present invention relates generally to mobile media, and more particularly to a system and method for capturing, aggregating, and presenting attention hotspots in mobile media.

BACKGROUND

Applications that enable access to online temporal media, such as videos and music, are increasingly prevalent on mobile devices. The temporal media may be stored online and streamed to the user by a site such as YOUTUBE™, or directly downloaded and played on the mobile device. Common features associated with temporal media are the ability of a user to view the media from a particular point, comment upon the media, bookmark the media, recommend the media to another user, and also rate the media. Comments, bookmarks, and ratings may be stored on the same site that hosts the temporal media, on yet another site, or locally on the mobile device.

Often, ratings are used to create a list of the "Most Popular" media on the site, allowing users quick access to those media. Popular rating systems include the "thumbs up" and "thumbs down" rating system utilized by social bookmarking Web sites such as DIGG™ and DELICIOUS™, and the "star system" utilized by video Web sites such as YOUTUBE™, NETFLIX™, and others. These rating systems require that the user make explicit input to the system and generally take the individual media (usually a single Web resource such as a URL) as a single entity for rating. Temporal media (such as movies and songs) are far more complex and can be taken as a series of individual segments (e.g. scenes). Existing systems fail to systematically associate tacit user interests in the media, derived from micro-interactions with the media, a browser, or player, with individual media segments.

Thus, there is a need in the art for a system and method that implicitly identifies, or infers, attention hotspots within temporal media. The system and method also preferably aggregates attention hotspots from a number of users, and presents a user with suggested attention hotspots of interest for temporal media.

SUMMARY OF THE INVENTION

A method, system and computer program product for providing an attention hotspot in temporal media is provided. In one embodiment, the method comprises identifying at least one event related to playback or browsing of the temporal media, deriving the significance of the identified event in accordance with one or more rules, selecting and assigning a signifier based on the derived significance of the event, and associating the signifier with a specific segment of the temporal media.

In another embodiment, the system comprises a mobile device comprising a first memory and a first processor coupled to a server comprising a second memory and a second processor, wherein the mobile device provides at least one event identifier to the server, and the server is operable to derive the significance of the identified event in accordance with one or more rules, select a signifier based on the derived significance of the event, and associate the signifier with a specific segment of the temporal media.

In another embodiment, a computer program product embodying the method is also disclosed.

DETAILED DESCRIPTION

A method, system and computer program product for providing an attention hotspot in temporal media is provided. In one embodiment, the method comprises identifying at least one event related to playback or browsing of the temporal media, deriving the significance of the identified event in accordance with one or more rules, selecting and assigning a signifier based on the derived significance of the event, and associating the signifier with the temporal media. In another embodiment, the system comprises a server and a mobile device, wherein the server is operable to identify at least one event related to playback or browsing of the temporal media, derive the significance of the identified event in accordance with one or more rules, select a signifier based on the derived significance of the event, and associate the signifier with a specific segment of the temporal media. The server provides the signifier to the mobile device. The invention is described in the context of a cellular device capable of interacting with, browsing, and playing back temporal media. However, it is understood that the invention may be utilized in general by any computing system capable of such interactions with temporal media of any sort.

Figure 1:
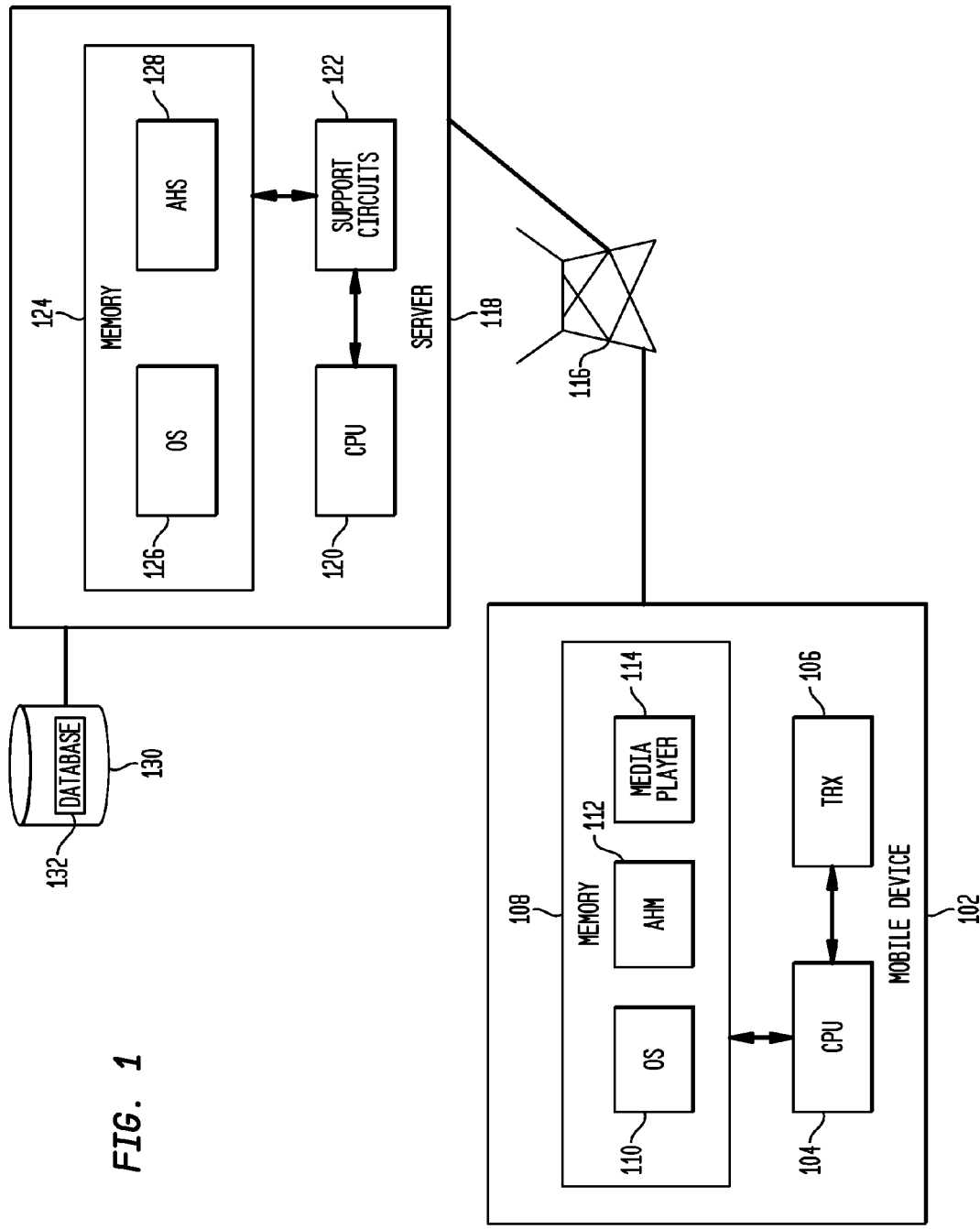
FIG. 1 is a system overview in accordance with one embodiment of the invention.

FIG. 1 is a system overview of an environment in which the present invention can be utilized. The system comprises a mobile or cellular device 102 coupled to a server 118 via a cellular network 116. The invention is not limited to cellular devices, and any general computing device capable of playing back temporal media may be substituted for the cellular device 102 within the scope of the invention. Such computing devices include desktop computers, laptop computers, personal digital assistants, and the like. Similarly, the cellular network 116 may be replaced by any standard network, such as the Internet, Ethernet, or PSTN.

The mobile device 102 comprises a processor 104, a transceiver (TRX) 106, and a memory 108. The processor (CPU) 104 is coupled to the memory 108 and the transceiver 106. The processor 104 executes programs stored in the memory 108, such as the mobile operating system (OS) 110. The transceiver 106 enables wireless (RF) communication between the mobile device 102 and the server 118 via the cellular network 116. Other components commonly found within a mobile device 102, such as a power source, an antenna, a storage unit, and various support circuitry are understood to be present, but not shown in FIG. 1.

The memory 108 may include random access memory, read only memory, removable disk memory, flash memory, and various combinations of these types of memory. The memory 108 is sometimes referred to as a main memory and may in part be used as cache memory. The memory 108 stores the OS 110, an "attention hotspot manager" (AHM) 112, and a media player 114. The OS 110 may be any mobile operating system such as SYMBIAN™, ANDROID™, or WINDOWS MOBILE™. The media player 114 is also known as the "browsing application" or "browsing tool" and is capable of interacting with, browsing and playing back temporal media, such as music and videos, to a user.

The AHM 112 is software that interacts with the media player 114. For a given media player 114 session, the AHM 112 recognizes media type, media metadata (e.g. identifier) and user interactions with the media. In one embodiment, the AHM 112 functions as middleware between the mobile device 102 and the sewer 118. The function of the AHM 112 is to infer attentional semantics from user interactions with the media player 114, intercommunicate with server 118, and to enhance the media player 114 experience, as described in more detail below. The media player 114, the AHM 112, and the server 118 share semantics for the notions of: focus (i.e., what the media player 114 is currently displaying in most detail), range (i.e., the amount of context surrounding the focus in the media player's 114 current display), zoom actions (i.e., the act of using the media player 114 to either reduce or enlarge the current context while maintaining focus), pan actions (i.e., the act of shuttling through a temporal dimension using the media player 114), and gawking actions (i.e., the act of not using zoom or pan and simply examining).

The server 118 comprises a processor (CPU) 120, support circuits 122, and a memory 124. The CPU 120 is coupled to the memory 124 via support circuits 122. The support circuit 122 includes cache, power supplies, clocks, input/output interface circuitry, and the like.

The memory 124 may include random access memory, read only memory, removable disk memory, flash memory, and various combinations of these types of memory. The memory 124 is sometimes referred to as a main memory and may in part be used as cache memory. The memory stores software such as operating system (OS) 126 and an "attention hotspot server" (AHS) 128.

The server 118 is coupled to storage 130. Storage 130 may be any mass storage device, such as a hard drive or a storage area network coupled to the server 118. The storage 130 stores a database 132 that comprises information related to the temporal media. The database may include such information as the names or titles of different temporal media and signifiers or "attention hotspots" associated with the temporal media as well as user identifications, action type identifiers, time stamps associated with the action type identifiers, focus details, range of view details, and zoom details.

Figure 2:
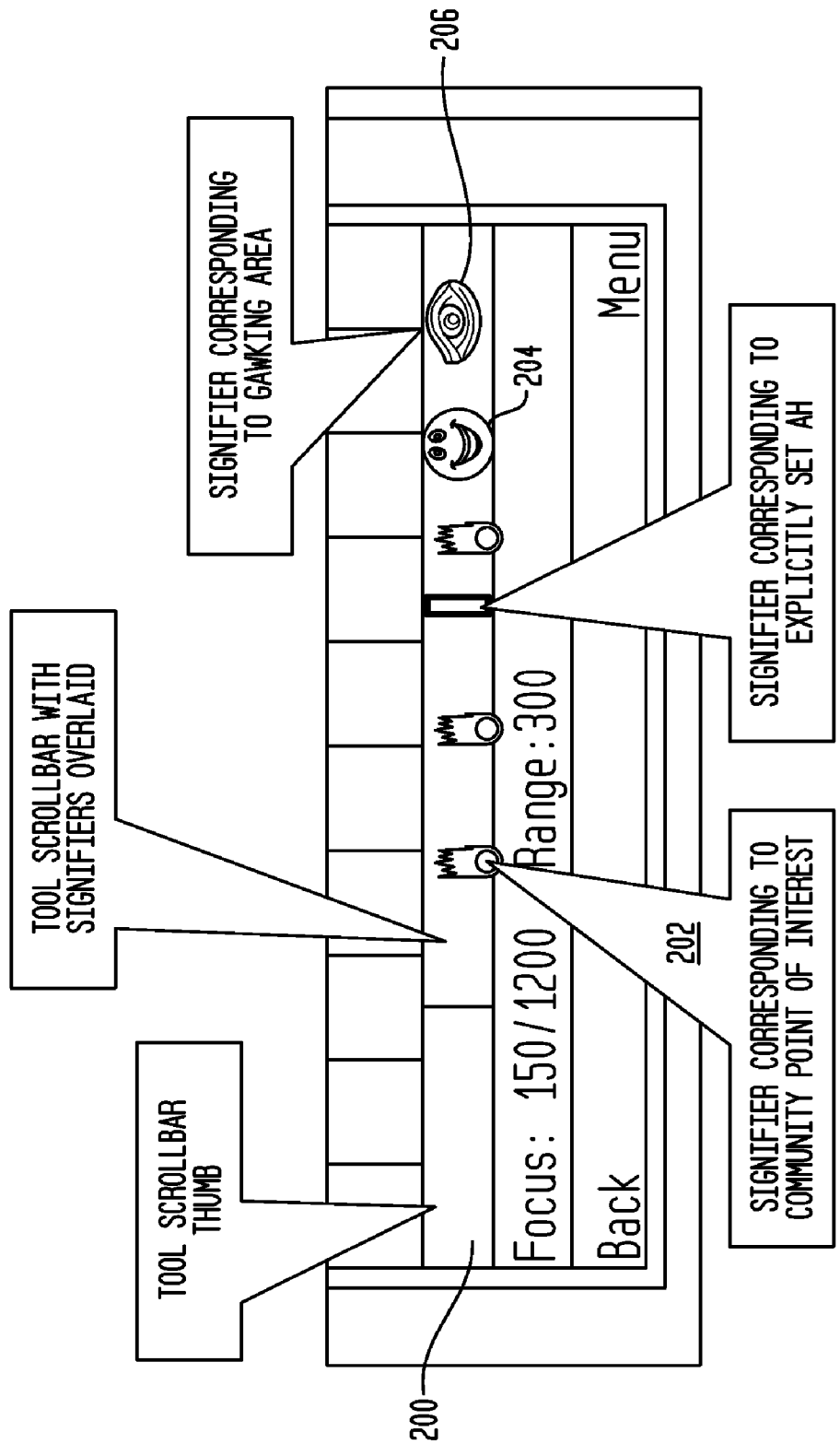
FIG. 2 is an example of a media player presenting attention hotspots to a user in accordance with one embodiment of the invention.

FIG. 2 is an example of a media player 114 benefiting from the present invention. Temporal media, as the name suggests, has a time characteristic which can be visually displayed on a timeline scroll bar 200. In the present example, the left-hand side of the scroll bar 200 represents the beginning time of the temporal media and the right-hand side of the scroll bar 200 represents the end time of the temporal media. The scroll bar 200 is populated with signifiers, or "attention hotspots", 202, 204 and 206. For example, the "flame" signifier 202 may indicate a "most popular" segment, the "happy face" signifier 204 may indicate something humorous at that particular location, and eye signifier 206 may indicate a gawked-at segment of the temporal media. The signifiers indicate a potential point of interest to the user and may or may not have been specifically chosen by the user. It is understood that the invention is not limited to only the signifiers in the example.

Signifiers may be created explicitly by a user, i.e., the user initiates the signifier creation process and assigns the signifier to a segment of the temporal media. The signifiers may also be created implicitly by the AHS 128 in conjunction with the AHM 112.

Figure 3:
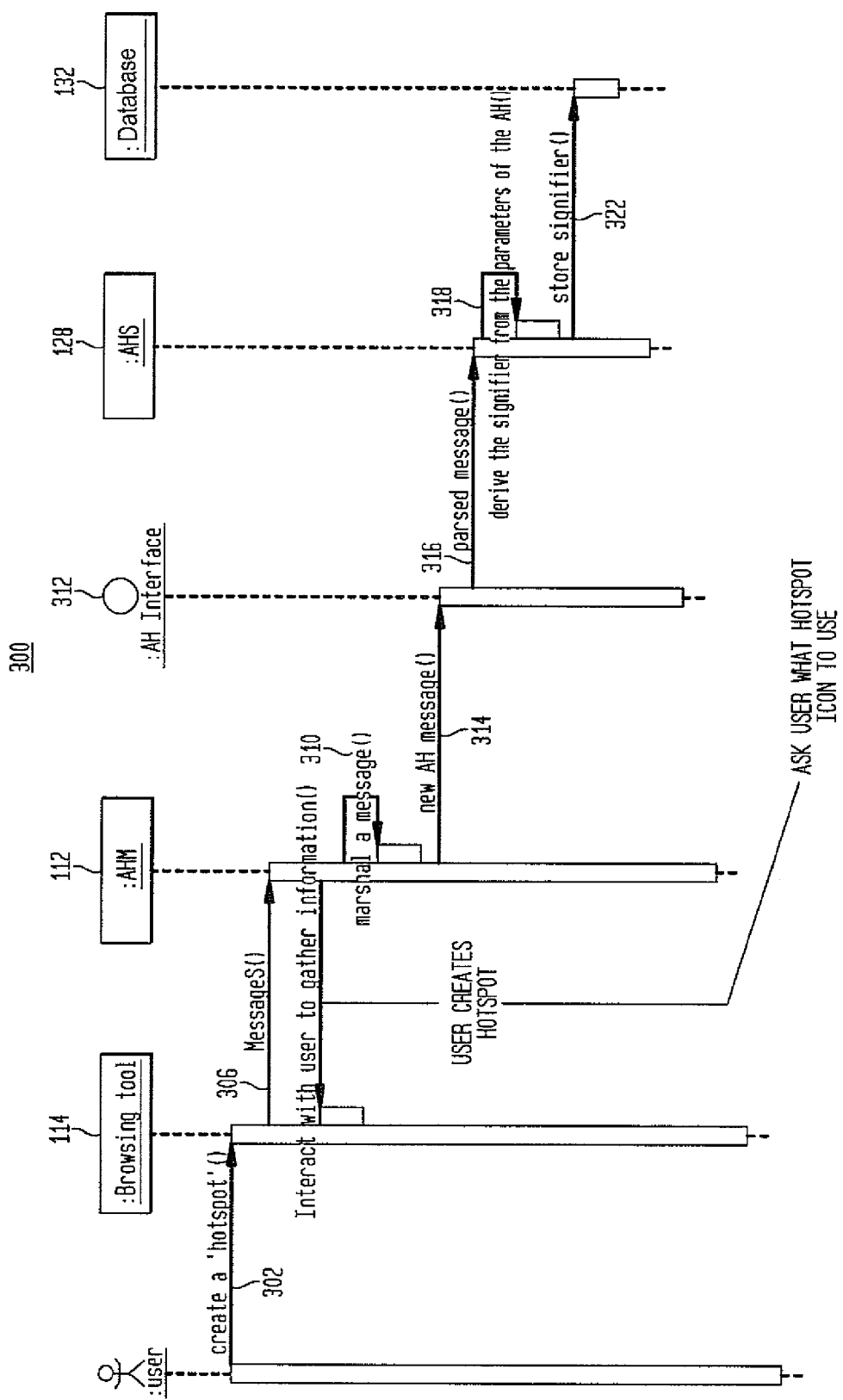
FIG. 3 is a flow diagram of a user explicitly creating an attention hotspot in accordance with one embodiment of the invention.

FIG. 3 is a flow diagram illustrating how a user may explicitly create a signifier. At step 302, the user initiates a request to "create a hotspot". In one embodiment, the request may be initiated through the media player 114. The request may be initiated by tapping a screen icon or striking a key or button on the mobile device 102 while the temporal media is being played backed. At step 306, an initiation message is passed from the media player 114 to the AHM 112. The initiation message carries the request to create the signifier. At step 310, the AHM 112 parses the initiation message to determine what data should be passed between the AHM 112 and the AHS 128. The AHM 112 composes an appropriate message to pass to the AHS 128. In one embodiment, the AHM 112 is capable of communicating the message with the AHS 128 via any standard network protocol, such as XML over an HTTP or HTTPS connection. In another embodiment, the AHM 112 and AHS 128 communicate via short message service (SMS).

In one embodiment, the message composed by the AHM 112 comprises a unique user identifier, a media identifier, a focus identifier, a range identifier, and a signifier identifier. An Attention Hotspot (AH) descriptor may be optionally included in the message. The user identifier uniquely identifies the user of the mobile device. Users may be identified by a MAC address, an electronic serial number (ESN), a mobile telephone number, or any other means of uniquely identifying the user. The media identifier identifies the temporal media. The media identifier may be a title associated with the media, a file name, an MD5 hash of the media identifier, or any other unique identifier. The focus identifier identifies the particular point of interest within the temporal media at the time of AH capture. Examples of the focus identifier include, but are not limited to, the timestamp of the point in the media, the particular frame within the video media or a particular stanza, beat, or note within a music media. The range identifier indicates a particular range around the focus identifier that is of interest to the user at the time of AH capture. As an example, the range may be a time value, such as +/−1 minute from the focus identifier. As another example, the range may indicate a number of frames before and after the focus identifier, e.g., 10 frames before and 10 frames after the focus identifier. The message may also include other infatuation, such as the type of mobile device, the operating system used by the mobile device, and the screen size of the mobile device. An additional identifier can accompany any given message marshaled by the AHM 112 and can comprise of any combination of: timestamp, textual token, or unique serial number (e.g., serving as a counter of event from this AHM).

At step 314, the message composed by the AHM 112 is passed to the AHS 128. At step 316, the AHS 128 parses the message provided by the AHM 112 by reading the fields stored within the message. At step 318, the AHS 128 derives the significance of the message by reading the signifier identifier in the message.

In one embodiment, the signifier identifiers that may indicate a "zoom event", a "pan event", and a "gawk event" are set. As the names imply, a "zoom event" occurs when a user uses the media player 114 to "zoom in" on or "zoom out" from a segment of the temporal media from either relatively coarse detail to more targeted detail or visa versa (in a relative sense), a "pan event" occurs when a user exhibits a series of browsing actions (not zooms) all clustered around a particular point of the media, and a "gawk event" occurs when a user pauses or stops at a particular point within the temporal media for a prescribed time before performing another action. The "focus identifier" indicates the particular point within the temporal media where the event took place. The "range identifier" indicates a surrounding range of points related to the point identified by the "focus identifier" and comprises the extent of context under study in the media player 114 at the moment of AH capture. At step 322, the signifier identifier is stored in the database 132 along with whichever of the above-mentioned identifiers is relevant in the use case, such as media identifier, focus, and range identifiers. In one embodiment, the signifier identifier is stored along with the user identifier. In another embodiment, the signifier identifier is stored anonymously without any accompanying user identifier. At minimum, a signifier and its details is associated with a media or media segment.

Upon creation and storage of a signifier on the AHS 128 side, the AHS 128 can, as required, transmit the signifier back to the AHM 112. The AHM 112 may then display the signifier to the user as shown in FIG. 2 when the accompanying temporal media is played, browsed, or scanned.

Figure 4:
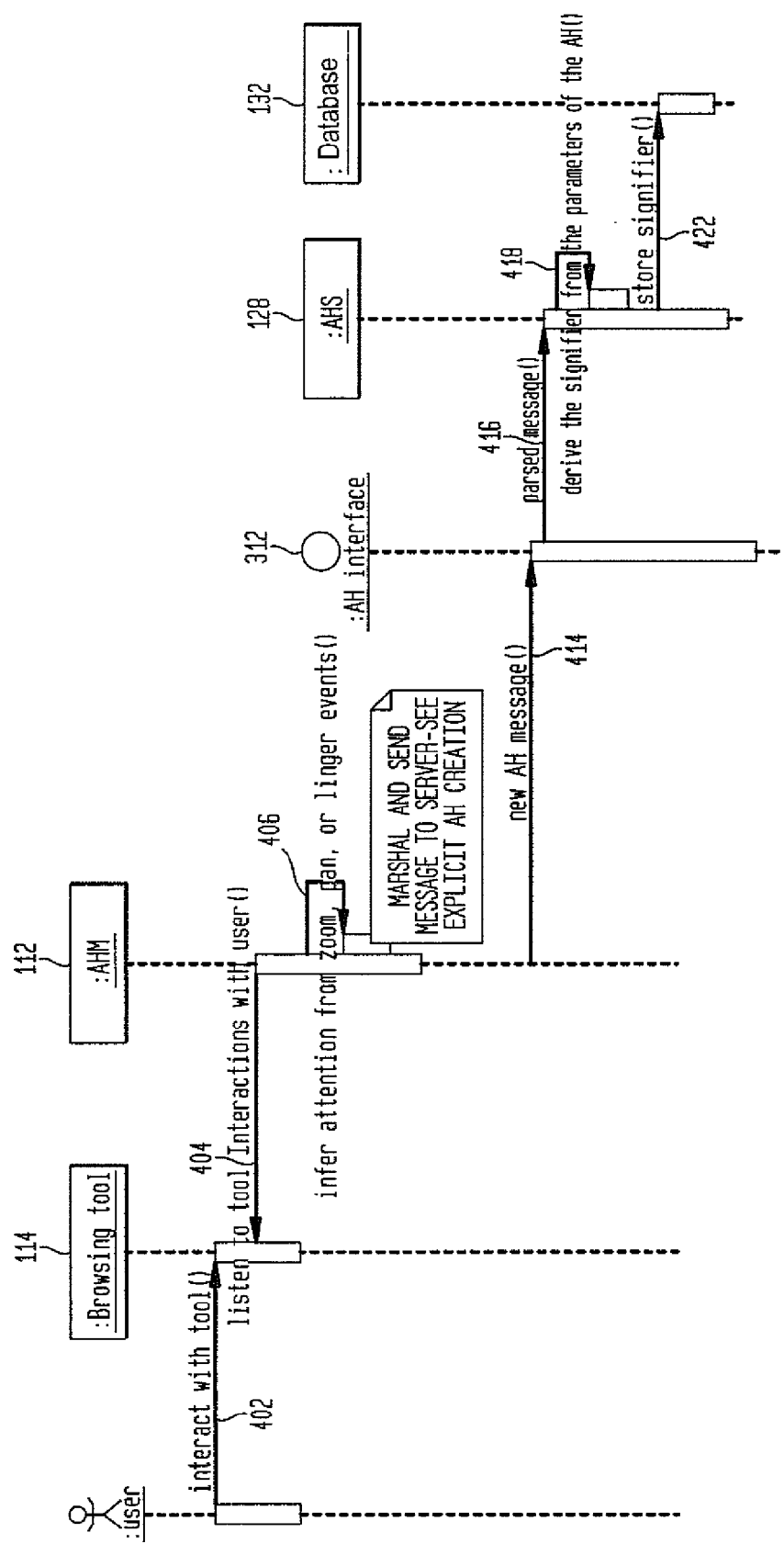
FIG. 4 is a flow diagram of a server implicitly creating an attention hotspot in accordance with one embodiment of the invention.

FIG. 4 is a flow diagram illustrating how a user may implicitly create a signifier which is also known as an icon. At step 402, the user takes some action using the media player 114 such as panning the temporal media, zooming in or out of the temporal media, playing or pausing the temporal media, or simply looking at the media without interacting with the media player 114. At step 404, a message is passed from the media player 114 to the AHM 112. The message carries information about the user's interaction with the media player 114, e.g., the user might be zooming into detail at a particular focus spot. At step 406, the AHM 112 parses the message to determine what data should be passed between the AHM 112 and the AHS 128. The AHM 112 composes an appropriate message to pass to the AHS 128. In one embodiment, the AHM 112 is capable of communicating the message with the AHS 128 via any standard network protocol, such as XML over an HTTP or HTTPS connection. In another embodiment, the AHM 112 and AHS 128 communicate via short message service (SMS).

In one embodiment, the message composed by the AHM 112 comprises a unique user identifier, a media identifier, a focus identifier, a range identifier, a zoom identifier, and a gawk identifier. The user identifier uniquely identifies the user of the mobile device. Users may be identified by a MAC address, an electronic serial number (ESN), a mobile telephone number, or any other means of uniquely identifying the user. The media identifier identifies the temporal media. The media identifier may be a title associated with the media, a file name, an MD5 hash of the media identifier, or any other unique identifier. The focus identifier identifies the particular point of interest within the temporal media at the time of AH capture. Examples of the focus identifier include, but are not limited to, the timestamp of the point in the media, the particular frame within the video media or a particular stanza, beat, or note within a music media. The range identifier indicates a particular range around the focus identifier that is of interest to the user at the time of AH capture. As an example, the range may be a time value, such as plus or minus one minute from the focus identifier. As another example, the range may indicate a number of frames before and after the focus identifier, e.g., 10 frames before and 10 frames after the focus identifier. The message may also include other information, such as the type of mobile device, the operating system used by the mobile device, and the screen size of the mobile device. The zoom identifier indicates a specific area of interest zoomed in upon by the media player 114. If the temporal media is a video, the zoom identifier may indicate a specific frame in the video. If the temporal media is a music file, the zoom identifier may indicate a specific portion of the music file identified, for example, by its beat number or time. The gawk identifier indicates a portion of the temporal media that the user views, examines, or plays for an extended period of time, i.e., a time beyond a certain threshold, and may also indicate the duration of the gawking (e.g., time spent examining the media segment).

At step 414, the message composed by the AHM 112 is passed to the AHS 128. At step 416, the AHS 128 parses the message provided by the AHM 112 by reading the fields stored within the message. At step 418, the AHS 128 derives the significance of the message by matching the information stored in the message to a set of rules.

In one embodiment, threshold values for a "zoom event", a "pan event", and a "gawk event" are set. As the names imply, a "zoom event" occurs when a user uses the media player 114 to "zoom in" on a point within the temporal media, a "pan event" occurs when a user repeated views the regions closely surrounding a particular point within the media, and a "gawk event" occurs when a user pauses or stops at a particular point within the temporal media. The AHS 128 compares the data stored in the message passed from the AHM 112 against these threshold values. For example, if the media player 114 has been used to "zoom in" on a portion of the temporal media, and the "zoom identifier" value exceeds the threshold value for a "zoom event" then a zoom signifier is inferred. Likewise, if the media player 114 has been used to pan back and forth around a moment or replay a portion of the temporal media and the "pan identifier" exceeds the threshold value set for the "pan event", then a "pan event" is inferred. If the media player 114 has been used to pause upon a particular point within the temporal media, and the "gawk identifier" exceeds the threshold value set for the "gawk event", i.e., an amount of time, then a "gawk event" is inferred. The "focus identifier" indicates the particular point within the temporal media where the event took place, and the "range identifier" indicates a surrounding range of points related to the point identified by the "focus identifier". At step 422, if any of these threshold values are exceeded then an appropriate signifier, as inferred above, is stored in the database 132. In one embodiment, the signifier is stored along with the user identifier. In another embodiment, the signifier is stored anonymously without any accompanying user identifier. The signifier is also stored along with a media identifier and the focus identifier.

Upon creation of the signifier, the AHS 128 can pass the signifier back to the AHM 112. The AHM 112 may display the signifier to the user as shown in FIG. 2 when the accompanying temporal media is played.

Figure 5:
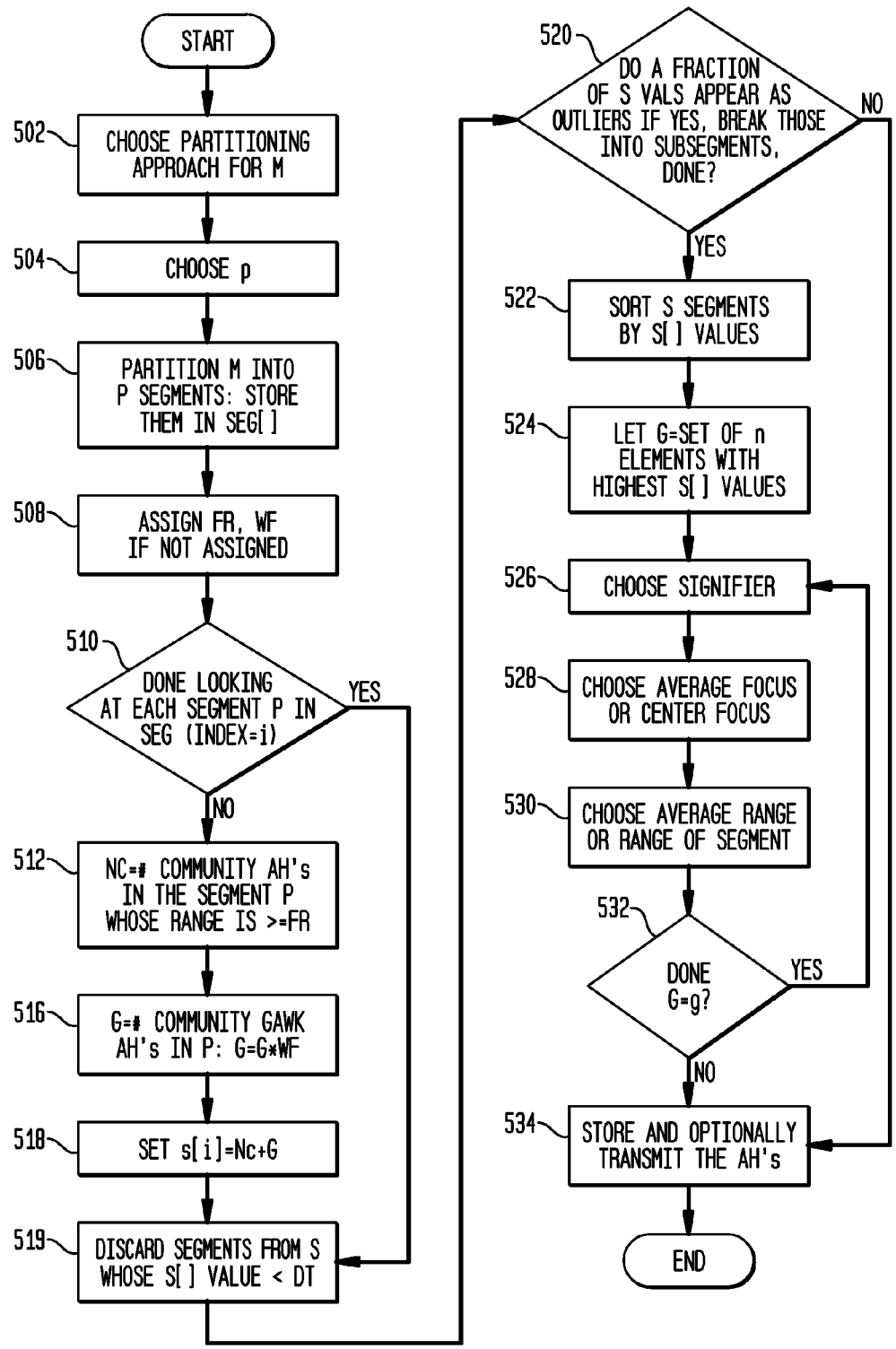
FIG. 5 is a flow diagram of a method for creating attention hotspots in accordance with one embodiment of the invention.

FIG. 5 is a flow diagram of a method for capturing and transmitting signifiers based on a community's interaction with the temporal media. In the flow diagram and the accompanying description, "M" stands for temporal media; "p" is the total number of segments the temporal media is divided into; "Si" is an individual segment within the total number of segments from 1 to p; "SEG" is a list of segments; WF is a weighting factor; FR is a focus range; DT is a discard threshold; and G is the total number of signifiers associated with an individual segment.

The method starts at block 502 when a partitioning approach is chosen for the temporal media "M". For example, a DVD may be partitioned according to its chapters, a video file may be partitioned into different segments, and a music file may be partitioned into different time segments. The main purpose of the step is to select an approach to decompose the temporal media into smaller individual segments "Si". At step 504, the total number of segments "p" is determined. In one embodiment, the segment size for each segment "Si" is the same. For example, each segment "Si" may be exactly three minutes long. In an alternative embodiment, the segment size for each segment may be different. For example, a DVD may be partitioned into segments (chapters) of varying times and length. Segment sizes may be measured by time, e.g., minutes and seconds, a number of frames in a video file, musical bars in a song, subsets of photographs in a time-series set, groups of slides in an animated slide-show, sub-groups of media in a timed multimedia presentation, etc. At step 506, the temporal media "M" is partitioned into "p" segments, and the value of "p" is stored in the variable "SEG".

At step 508, values are assigned to a "focus range" (FR) variable and a "weighting factor" (WF) variable. As discussed above a "focus range" indicates a portion of the temporal media immediately before and after (surrounding) a particular point of interest within the temporal media that is identified by a "focus identifier".

At decision step 510, a determination is made as to whether each segment has been examined for an interaction with the media player 114 that would indicate an "attention hotspot". The number of segments to be examined is stored in the variable "SEG". In one embodiment, a counter tracks the total number of segments examined, and all of the segments are examined when the value of the counter matches the value stored in "SEG". If all of the segments have been examined, i.e., the answer is "yes", then the method proceeds to step 519. Otherwise, the answer is "no" and the method proceeds to step 512.

At step 512, AHS 128 examines messages provided by the AHM 112 to determine which messages may indicate an "attention hotspot". The messages provided by the AHM 112 include information about the temporal media and any interaction between the temporal media and the media player 114. The information in the message may include a "focus identifier" or a value that indicates a "focus range". In one embodiment, if the value of the focus range indicated by the message exceeds a threshold value, then any media player interaction with the temporal media disclosed by the message is disregarded. These interactions are disregarded because this is an indication that the user did not focus in upon a particular point or segment of the temporal media. If the value of the focus range indicated by the message is equal to or less than a threshold value, then the AHS 128 associates an "attention hotspot" with the segment at the point indicated by the focus identifier in the message. In one embodiment, the threshold value for the focus range is set at the server side, i.e., AHS 128. Smaller threshold values indicate highly focused "attention hotspots".

At step 516, AHS 128 examines the remaining messages, i.e., the messages that are not disregarded at step 512, for "gawk events". Gawk events are indicated by a "gawk identifier" included in the message. The "gawk identifier" indicates a portion of the temporal media that the user views for an extended period of time that exceeds a certain threshold. The total number of "gawk events" in the segment is weighted according to a weight factor. In one embodiment, the weight factor is a multiplier. If the weight factor is a 1, then the weight factor has no effect upon the "gawk event". If the weight factor is a 2, then the associated "gawk event" is weighted twice as much as a "gawk event" associated with a weight factor of 1. The weight factor allows "gawk events" to be given more or less significance in the overall ranking of the segment; for example, if "gawk events" are made more significant, then users would see more segments in which those kinds of events were gathered by the server.

At step 518, the total score for the number of "attention hotspots" for an individual segment "Si" is calculated. In one embodiment, the total number of "attention hotspots" is the sum of "attention hotspots" found at step 512 and weighted number of "gawk events" found at step 516. In embodiments where there is only one user and one mobile device connected to the AHS 128, the total number of "attention hotspots" is the number of "attention hotspots" explicitly created by the user plus "attention hotspots" implicitly inferred from the AHM 112.

At step 519, the AHS 128 discards any segments associated with a scored value less than a discard threshold (DT) value. In one embodiment, the DT threshold is a minimum score below which the segment is not considered interesting enough to call it out with a signifier. Discarding these segments allows the number of signifiers presented to the user to be reduced.

In some embodiments, segments associated with a number of signifiers or "attention hotspots" that exceed a threshold value are re-evaluated and the number of signifiers is reduced. At decision step 520, a determination is made as to whether the there exists only a few segments of the media that contain most of the high scores for "attention hotspots". If the answer is "yes" then the method proceeds to divide these segments into yet smaller segments and proceeds back to step 510. If the answer is "no" then the method proceeds to step 522.

At step 522, the individual segments are sorted according to the number of signifiers as calculated at step 518. The segments with the greatest numbers of signifiers are selected at step 524. At step 526, each of these selected segments is examined and one of the signifiers associated with the segment selected at step 524 is selected. For example, assume the selected segment is associated with a large number of signifiers that indicate a "gawk event", i.e., the number of "gawk event" signifiers exceed a threshold value. A "gawk event" signifier is selected at step 526, and at step 528, an average focus value for the "gawk event" signifier is calculated from the focus values of all the "gawk" event signifiers associated with that particular segment, e.g., by summing the focus values and dividing by the number of values. At step 530, an average "focus range" value is calculated from all of the "focus range" values associated with the "gawk event" signifiers associated with that particular segment. One will understand that these steps apply to all possible signifiers associated with a segment, and the use of a signifier indicating a "gawk event" is only one possible example.

The calculation of an average focus value and an average range for a particular type of signifier associated with a segment allows the total number of signifiers associated with the segment to be reduced. Instead of presenting numerous individual signifiers to the user, only a single, or a few, signifiers need be presented. Because the average may be derived from a set of individual hotspots from a larger community, the average values present, overall, what an entire community believes, on the whole, is the most significant portion of a segment or media.

At decision step 532, a determination is made as to whether any additional segments include a number of signifiers that exceed a threshold value. If the answer is "yes" then the method loops back to step 526. If the answer is "no" then the method proceeds to step 534. At step 534, the AHS 128 stores a list of the "attention hotspots", their associated signifiers, the focus value associated with each signifier and their focus ranges in a database 132. Optionally, the signifiers may be presented to the user and the mobile device by the AHS 128.

Figure 6:
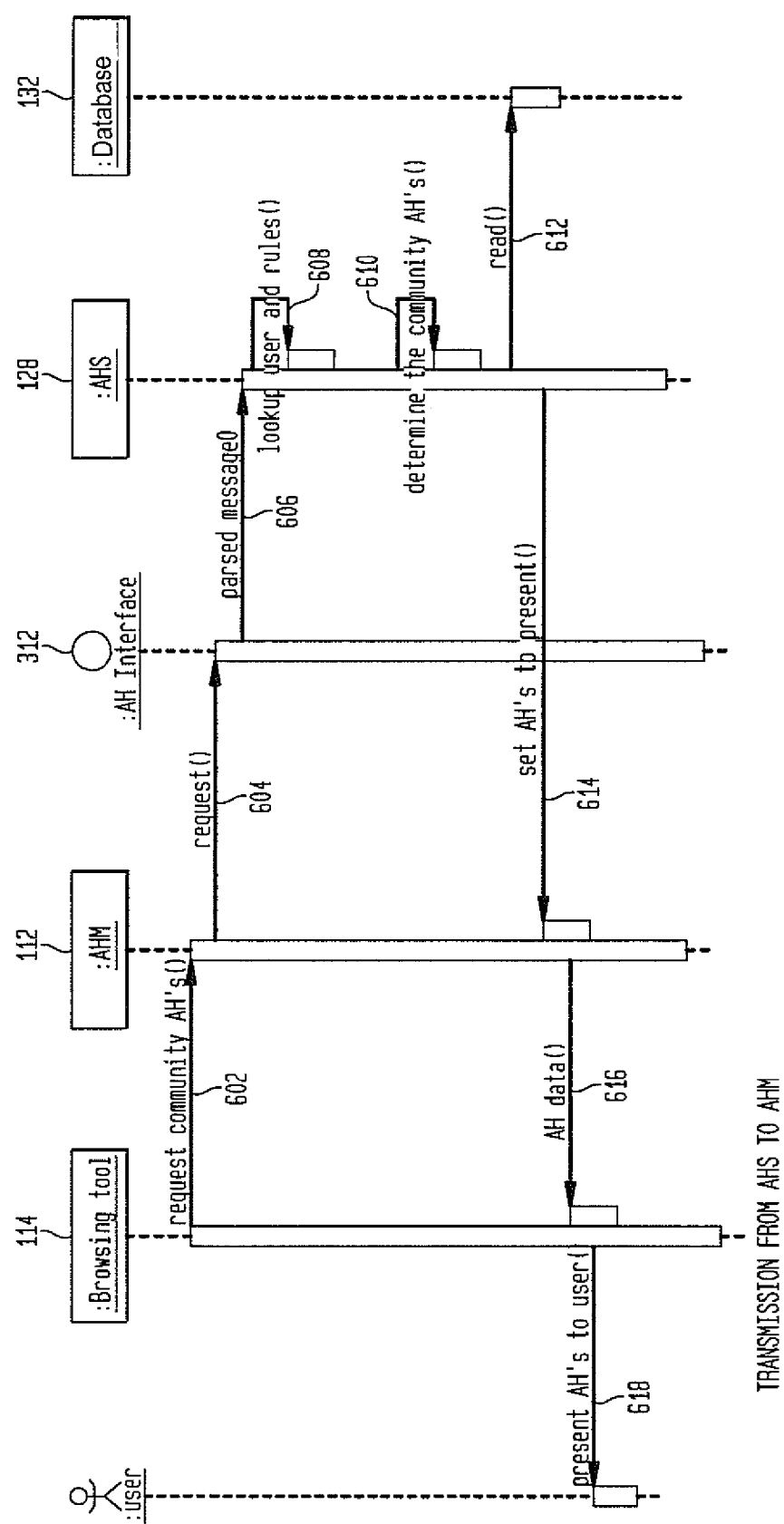
FIG. 6 is a flow diagram of a server presenting a user with an attention hotspot in accordance with one embodiment of the invention.

FIG. 6 is a flow diagram of a method for requesting "attention hotspots" from a server and the server transmitting to the AHM 112 the "attention hotspots" in accordance with one embodiment of the invention. The AHM 112 works with the media player 114 to present the hotspot signifiers in an appropriate way. The user may initiate the request for the "attention hotspots" or the AHM 112 may automatically request the "attention hotspots" when temporal media is viewed on the media player 114.

The method starts at step 602 when the media player 114 provides a request for "attention hotspots" to the AHM 112. The request may be initiated by the user or provided automatically by the media player 114 upon viewing of the temporal media. At step 604, the AHM 112 composes a message that includes information about the user and the temporal media, such as a user identifier and a media identifier. The message is communicated to the AHS. At step 606, the message is parsed and interpreted by the AHS 128. At step 608, the AHS 128 matches the user and the temporal media to a set of rules, and at step 610, determines which community "attention hotspots" may be presented to the user by executing the steps that start at step 502.

The rules facilitate presentation of the most appropriate "attention hotspots" to the user, as described by the steps starting at step 502. The rules may include a list of "attention hotspots" that should not be presented to the user, or a list of "attention hotspots" previously created by the user. At step 612, the "attention hotspots" and their associated signifiers are read from the database 132.

At step 614, the "attention hotspots" are communicated by the AHS 128 to the AHM 112 in a message. In one embodiment, the message includes one or more signifiers, "focus identifiers" and "focus ranges" associated with each signifier. In one embodiment, the AHS 128 communicates with the AHM 112 via the cellular network 116. At step 616, the AHM 112 receives the message from the AHS 128 and parses the message. At step 618, the AHM uses the information stored in the message to present the "attention hotspots" to the user in conjunction with the media player 114.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

The invention claimed is:

1. A method for providing one or more attention hotspots in a temporal media, comprising:
   identifying at least one event related to playback or browsing of the temporal media;
   deriving a significance of the identified event in accordance with one or more rules;
   assigning a signifier based on the derived significance of the event;
   associating the signifier with the temporal media, further comprising:
      segmenting the temporal media into one or more segments,
      deriving for each segment one or more signifiers in accordance with the one or more rules, and
      associating each of the signifiers with at least one of the segments such that:
         when a user has shown interest in a sequence within one of the one or more segments by panning the sequence, automatically creating a pan event signifier and associating the pan event signifier with the one or more segments,
         when a user has shown interest in a sequence within one of the one or more segments expressed through viewing the sequence for a time greater than a threshold period, automatically creating a gawk event signifier and associating the gawk event signifier with the one or more segments, and
         when a user has shown interest in a sequence within one or more segments expressed through one or more zoom interactions, automatically creating a zoom event signifier and associating the zoom event signifier with the one or more segments;
   presenting the signifier to a user visually on a timeline scroll bar for the temporal media; and
   allowing the user to override the presented signifier by one of choosing another signifier to be associated with the temporal media and preventing the presented signifier to be associated with the temporal media.

2. The method of claim 1 further comprising: segmenting the temporal media into one or more segments based upon a category of media.

3. The method of claim 1, further comprising:
   aggregating a plurality of events associated with the temporal media from a plurality of users;
   deriving a significance of the plurality of events in accordance with the one or more rules;
   automatically assigning a signifier based on the derived significance of the plurality of events;
   presenting the signifiers to a user visually on a timeline scroll bar for the temporal media; and
   allowing the user to override the presented signifier by one of choosing another signifier to be associated with the temporal media and preventing the presented signifier to be associated with the temporal media.

4. A computer program product for providing an attention hotspot in temporal media, comprising:
   a non-transitory storage medium readable by a processor and storing instructions for execution by the processor for performing a method comprising:
      identifying at least one event related to playback or browsing of the temporal media;
      deriving a significance of the identified event in accordance with one or more rules;
      assigning a signifier based on the derived significance of the event;
      associating the signifier with the temporal media, further comprising:
         segmenting the temporal media into one or more segments,
         deriving for each segment one or more signifiers in accordance with the one or more rules, and
         associating each of the signifiers with at least one of the segments such that:

when a user has shown interest in a sequence within one of the one or more segments by panning the sequence, automatically creating a pan event signifier and associating the pan event signifier with the one or more segments, when a user has shown interest in a sequence within one of the one or more segments expressed through viewing the sequence for a time greater than a threshold period, automatically creating a gawk event signifier and associating the gawk event signifier with the one or more segments, and when a user has shown interest in a sequence within one or more segments expressed through one or more zoom interactions, automatically creating a zoom event signifier and associating the zoom event signifier with the one or more segments;

presenting the signifier to a user visually on a timeline scroll bar for the temporal media; and allowing the user to override the presented signifier by one of choosing another signifier to be associated with the temporal media and preventing the presented signifier to be associated with the temporal media.

5. The computer program product of claim 4, further comprising:

segmenting the temporal media into one or more segments based upon a category of media.

6. The computer program product of claim 4, further comprising:

aggregating a plurality of events associated with the temporal media from a plurality of users;

deriving a significance of the plurality of events in accordance with one or more rules;

automatically assigning a signifier based on the derived significance of the plurality of events;

presenting the signifiers to a user visually on a timeline scroll bar for the temporal media; and allowing the user to override the presented signifier by one of choosing another signifier to be associated with the temporal media and preventing the presented signifier to be associated with the temporal media.

7. A system for providing an attention hotspot in temporal media, comprising:

a mobile device comprising a first memory and a first processor coupled to a server comprising a second memory and a second processor, wherein the mobile device provides at least one event identifier to the server, and the server is operable:

to derive the significance of the identified event in accordance with one or more rules, to select a signifier based on the derived significance of the event, to associate the signifier with the temporal media, by determining:

when a user has shown interest in a sequence within one of the one or more segments by panning the sequence, automatically creating a pan event signifier and associating the pan event signifier with the one or more segments, when a user has shown interest in a sequence within one of the one or more segments expressed through viewing the sequence for a time greater than a threshold period, automatically creating a gawk event signifier and associating the gawk event signifier with the one or more segments, and when a user has shown interest in a sequence within one or more segments expressed through one or more zoom interactions, automatically creating a zoom event signifier and associating the zoom event signifier with the one or more segments;

to present the signifier to a user visually on a timeline scroll bar for the temporal media; and to allow the user to override the presented signifier by one of choosing another signifier to be associated with the temporal media and to prevent the presented signifier to be associated with the temporal media.

8. The system of claim 7, wherein the server is further operable to segment the temporal media into one or more segments based upon a category of media.

9. The system of claim 7, wherein the server is further operable to aggregate a plurality of events associated with the temporal media from a plurality of users, to derive a significance of the plurality of events in accordance with one or more rules, to select a signifier automatically based on the derived significance of the plurality of events, and to provide the signifier to the mobile device for visual presentation on a timeline scroll bar for the temporal media, and the mobile device is operable to allow a user to override the selected signifier by one of choosing another signifier to be associated with the temporal media and preventing the selected signifier to be associated with the temporal media.

* * * * *

UNITED STATES PATENT AND TRADEMARK OFFICE
CERTIFICATE OF CORRECTION

| | | |
|---|---|---|
| PATENT NO. | : 8,296,675 B2 | Page 1 of 1 |
| APPLICATION NO. | : 12/612719 | |
| DATED | : October 23, 2012 | |
| INVENTOR(S) | : Falchuk | |

It is certified that error appears in the above-identified patent and that said Letters Patent is hereby corrected as shown below:

In the Specification

In Column 3, Line 29, delete "sewer" and insert -- server --, therefor.

In Column 4, Line 61, delete "infatuation," and insert -- information, --, therefor.

Signed and Sealed this
Eighteenth Day of November, 2014

Michelle K. Lee
*Deputy Director of the United States Patent and Trademark Office*